(12) United States Patent
Pyykönen (10) Patent No.: US 6,793,030 B2
(45) Date of Patent: Sep. 21, 2004

(54) SWING ARM

(75) Inventor: Tapani Pyykönen, Rovaniemi (FI)

(73) Assignee: Bombardier - Nordtrac Oy, Rovaniemi (FI)

( * ) Notice: Subject to any disclaimer, the term of this patent is extended or adjusted under 35 U.S.C. 154(b) by 30 days.

(21) Appl. No.: 10/348,349

(22) Filed: Jan. 22, 2003

(65) Prior Publication Data

US 2004/0016583 A1 Jan. 29, 2004

Related U.S. Application Data

(63) Continuation-in-part of application No. 29/164,431, filed on Jul. 25, 2002.

(51) Int. Cl.[7] ............................................... B62M 29/00
(52) U.S. Cl. ................. 180/182; 180/190; 280/124.128
(58) Field of Search ................................ 180/182, 190, 180/193; 280/124.128, 124.153

(56) References Cited

U.S. PATENT DOCUMENTS

| 3,664,446 A | * | 5/1972 | Burtis et al. | 180/184 |
| 3,841,649 A | * | 10/1974 | McMullen | 280/16 |
| 4,699,234 A | * | 10/1987 | Shinozaki et al. | 180/233 |
| 5,332,058 A | * | 7/1994 | Bianco | 180/180 |
| 5,467,839 A | * | 11/1995 | Yoshio | 180/233 |
| 2003/0159868 A1 | * | 8/2003 | Alexander | 180/190 |

OTHER PUBLICATIONS

Ski–Doo Parts Catalog, MX Z 800, (Nov., 1999).

* cited by examiner

Primary Examiner—Lesley D. Morris
Assistant Examiner—Daniel Yeagley
(74) Attorney, Agent, or Firm—BRP Legal Services; Jonathan D. Cutler (57) ABSTRACT

A swing arm for a snowmobile has an upwardly curved, stepped, or angled intermediate portion that increases the swing arm's ground clearance relative to conventional, straight swing arms. The increased ground clearance permits more snow and other elements to pass underneath the swing without contacting the swing arm.

20 Claims, 6 Drawing Sheets

SWING ARM

CROSS-REFERENCE

This application is a continuation-in-part of U.S. Design application Ser. No. 29/164,431, entitled "SWING ARM," filed on Jul. 25, 2002, the entirety of which is incorporated herein by reference.

BACKGROUND OF THE INVENTION

1. Field of the Invention

This invention concerns the construction of a swing arm to which a ski of a snowmobile is attached. In particular, this invention encompasses a swing arm construction for the front suspension of a snowmobile that facilitates the passage of snow and other elements underneath the swing arm.

2. Description of Related Prior Art

Figure 6:
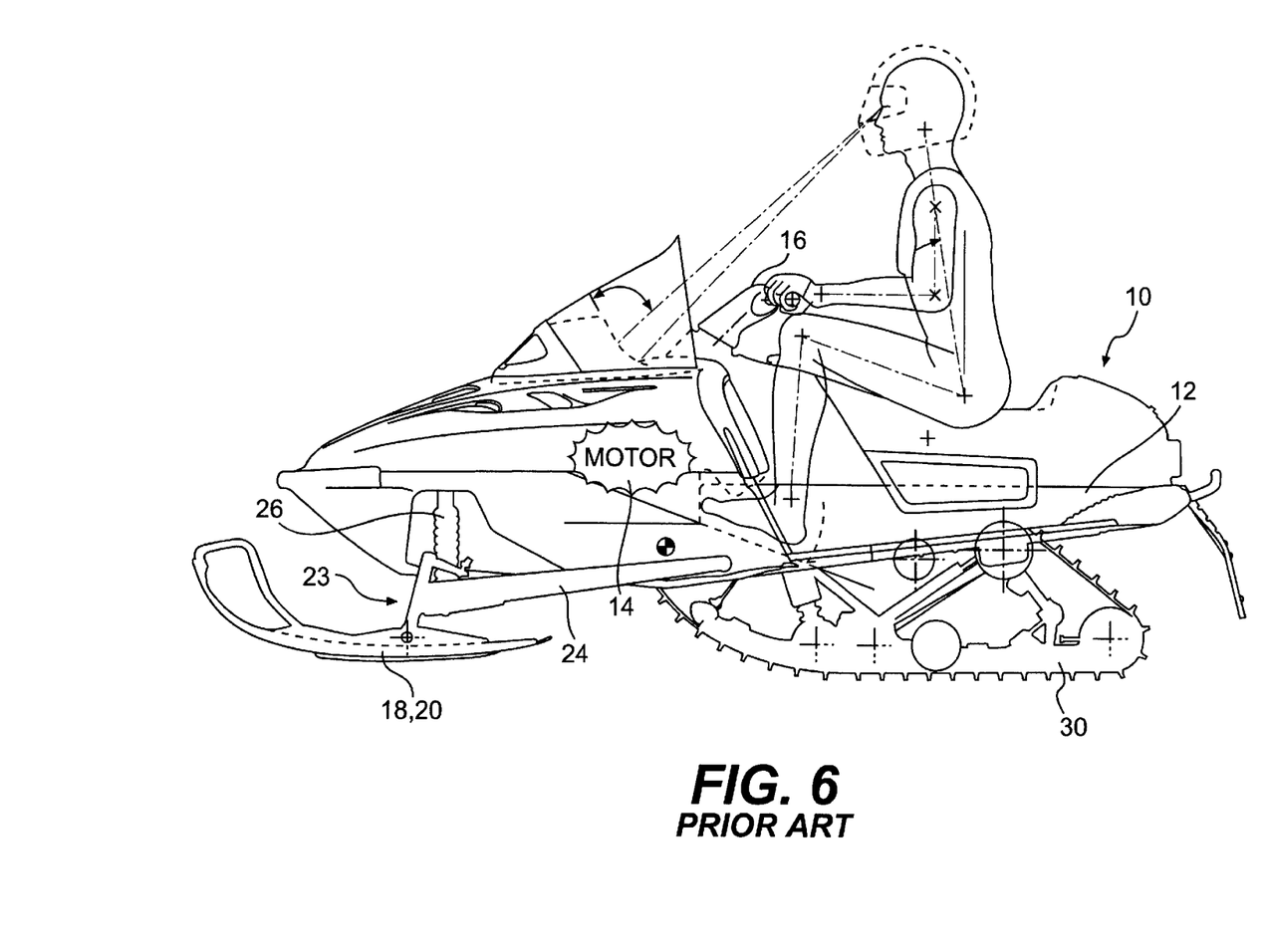
FIG. 6 is a left side view of a conventional snowmobile manufactured by Bombardier Inc., of Montreal, Quebec, Canada.

FIG. 6 illustrates a conventional snowmobile 10, which is manufactured by Bombardier Inc. of Montreal, Quebec, Canada. While only the left side of the snowmobile 10 is illustrated, those skilled in the art would readily appreciate that the right side is essentially a mirror image thereof.

The snowmobile 10 is constructed with a frame 12 powered by a motor 14. The motor 14 is preferably an internal combustion engine, which may be one of either the two-stroke or four-stroke variety. Handlebars 16 are disposed above and to the rear of the motor 14. The handlebars 16 operatively connect to two skis 18, 20 disposed at the front of the snowmobile 10. When turned by the handlebars 16, the skis 18, 20 turn the snowmobile 10 in the desired direction.

The skis 18, 20 are suspended from a front suspension system 23. The front suspension system 23 includes, among other components, two straight swing arms 24, one disposed on either side of the snowmobile 10. The swing arms 24 connect to shock absorbers 26.

The motor 14 operatively connects to an endless track 30 at the rear of the snowmobile 10 beneath a tunnel of the frame 12. The endless track 30 propels the snowmobile 10 forward (or backward, as the case may be).

Figure 7:
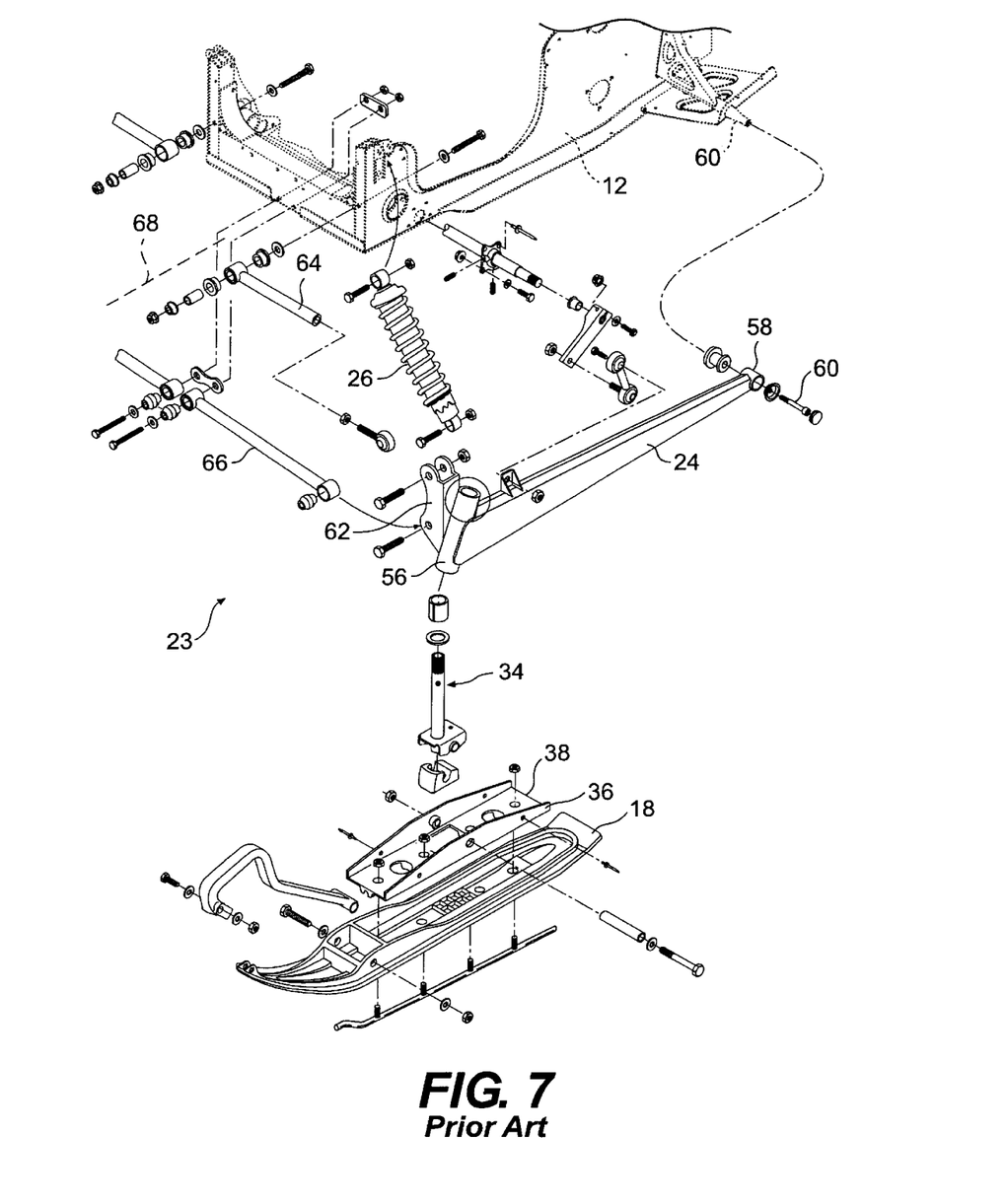
FIG. 7 is an exploded view of a front suspension system of the snowmobile illustrated in FIG. 6.

As illustrated in FIG. 7, a spindle 34 connects to the left ski 18 through a bridge 36. The bridge 36 typically is an elongated U-shaped structure with a bottom portion 38 connected to the ski 18. The spindle 34 and ski 18 are attached to the snowmobile front suspension system 23 via a spindle holder 56, which is attached to a forward portion of the swing arm 24. A rear portion of the swing arm 24 connects to the frame 12 via a pivot collar 58 and pin 60. Connecting the swing arm 24 to the frame 12 of the snowmobile 10 in this manner serves at least two functions. First, the pivot collar 58 permits the swing arm 24 to pivot upwardly and downwardly, which allows the ski 18 to move up and down as the snowmobile 10 traverses the ground. The pivot collar 58 also holds the ski 18 in a generally fixed longitudinal position relative to the frame 12 so that the ski 18 does not move rearwardly during operation of the snowmobile 10.

A bracket 62 attaches to the forward portion of the swing arm 24 at the location of the spindle holder 56. The bracket 62 operatively connects to the frame 12 via upper and lower radius arm assemblies 64 and 66. The upper and lower radius arm assemblies 64, 66 serve at least two functions. First, they permit the swing arm 24 to pivot about the pivot collar 58. This, in turn, permits the spindle 34 and ski 18 to move up and down relative to the frame 12. Second, they keep the spindle 34 and ski 18 in a generally fixed lateral position with respect to a centerline 68 of the snowmobile 10. In other words, the radius arm assemblies 64, 66 prevent the ski 18 from collapsing laterally inwardly or outwardly during operation.

To cushion the forces experienced by the ski 18 as it traverses the ground (so that the forces are not transmitted to the rider), the shock absorber 26 extends between the bracket 62 and the frame 12. The shock absorber 26 ensures that the frame 12 remains disposed above the ground. It also dampens any shocks encountered when the snowmobile 10 encounters rough terrain.

The swing arm 24 is normally constructed of sheet metal that is bent to form a straight hollow channel. Tubular swing arms constructed from metals and carbon fibers are also known. One common feature of all swing arms is their straight-line construction from the front of the swing arm to the rear of the swing arm. Because the front end of the straight swing arm 24 is disposed at the spindle 34 and is therefore close to the ground, an intermediate portion of the swing arm 24 has a low ground clearance that creates an obstruction for passing snow and other elements. When traveling in powder snow, the skis 18, 20 tend to sink down into the snow and further reduce or eliminate the ground clearance of the swing arm 24.

SUMMARY OF THE INVENTION

It is, therefore, an aspect of one or more embodiments of the present invention to provide an improved snowmobile swing arm construction.

According to another aspect of one or more embodiments of the present invention, a swing arm includes upward curves, steps, or angles that improve the swing arm's ground clearance.

According to another aspect of one or more embodiments of the present invention, a swing arm assembly is provided with a rear portion adapted to pivotally connect to a snowmobile about a swing arm pivot axis, a forward portion having a bottommost point, and an intermediate portion extending between the front and rear portions and defining a lower edge. A portion of the lower edge is disposed above a line extending between the bottommost point and the swing arm pivot axis.

The portion of the lower edge is spaced from the line by a distance that is preferably at least 2 cm, is more preferably at least 4 cm, and is even more preferably at least 6 cm.

The lower edge may be curved or angled. The lower edge may alternatively form a step.

The swing arm assembly may also include a pivot collar attached to the rear portion such that the pivot collar defines the swing arm pivot axis.

The swing arm assembly may also include a spindle holder attached to the forward portion. The spindle holder is constructed and arranged to pivotally receive a ski The swing arm assembly may also include a bracket attached to the spindle holder. The bracket is adapted to receive at least one radius rod to attach the swing arm to a snowmobile.

The swing arm assembly may be combined with a snowmobile that includes a frame pivotally connected to the rear portion of the swing arm, a straddle-type seat supported by the frame, a steering ski supported by the front portion of the swing arm, and an endless track supported by the frame.

According to another aspect of one or more embodiments of the present invention, a swing arm assembly is provided with a rear portion adapted to pivotally connect to a snowmobile about a swing arm pivot axis, a forward portion having an upper front tip, and an intermediate portion extending between the front and rear portions and defining a lower edge. A portion of the lower edge is disposed above a line extending between the upper front tip and the swing arm pivot axis.

Additional and/or alternative aspects, features, and objects of the embodiments of the present invention will become apparent from the following drawings and detailed description.

BRIEF DESCRIPTION OF THE DRAWINGS

As would be recognized by one skilled in the art, a snowmobile has a front, a left side, a right side, and a rear when viewed by an individual sitting on the vehicle facing the direction of vehicle travel. Where reference is made to one side of the vehicle, it is to be assumed the opposite side is its mirror image unless otherwise specified.

Reference will be made hereinafter to the accompanying drawings, which illustrate embodiments of the present invention discussed herein, wherein.

DETAILED DESCRIPTION

Throughout the description of the embodiments of the present invention, reference will be made to various elements, the construction of which is readily known to those skilled in the art. Instead of providing an exhaustive description of each and every common component, only those elements required for an understanding of the present invention are described in detail.

Figure 1:
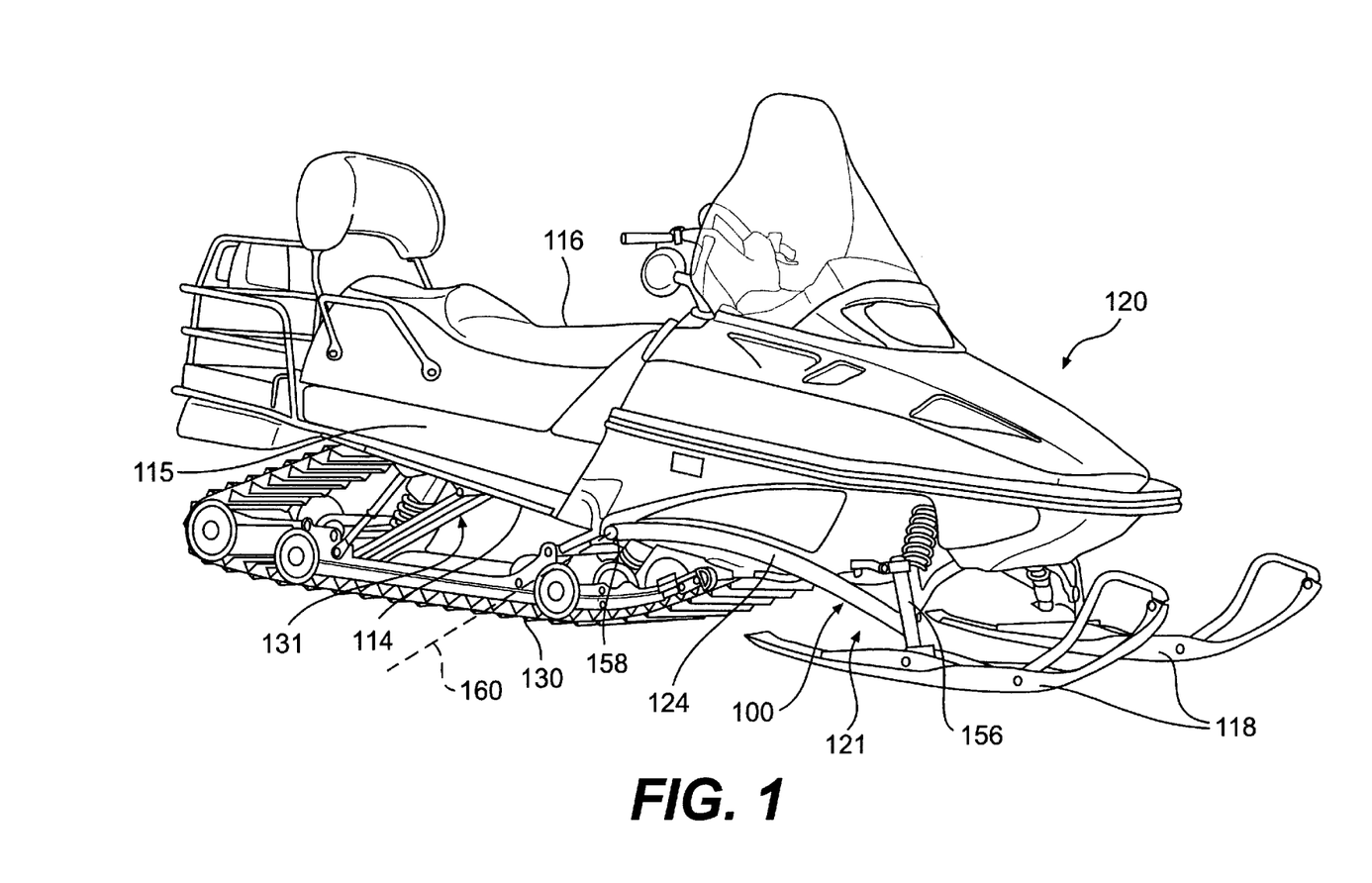
FIG. 1 is a side view of a snowmobile according to one embodiment of the present invention.

FIG. 1 illustrates a snowmobile 120 according to one embodiment of the present invention. The snowmobile 120 includes a frame 114. The frame 114 preferably includes a tunnel 115. The tunnel 115 preferably comprises a sheet of metal that is bent into an inverted, U-shape. The tunnel 115 supports an endless track 130 via a rear suspension system 131. A straddle-type seat 116 is also supported by the frame 114 and is adapted to accommodate a rider.

A front swing arm suspension system 121 extends between the frame 114 and two steering skis 118. Unlike conventional front swing arm suspension systems, the front swing arm suspension system 121 of the snowmobile 120 includes a curved swing arm assembly 100. The swing arm assembly 100 includes a swing arm 124, a spindle holder 156, and a pivot collar 158.

Figure 2:
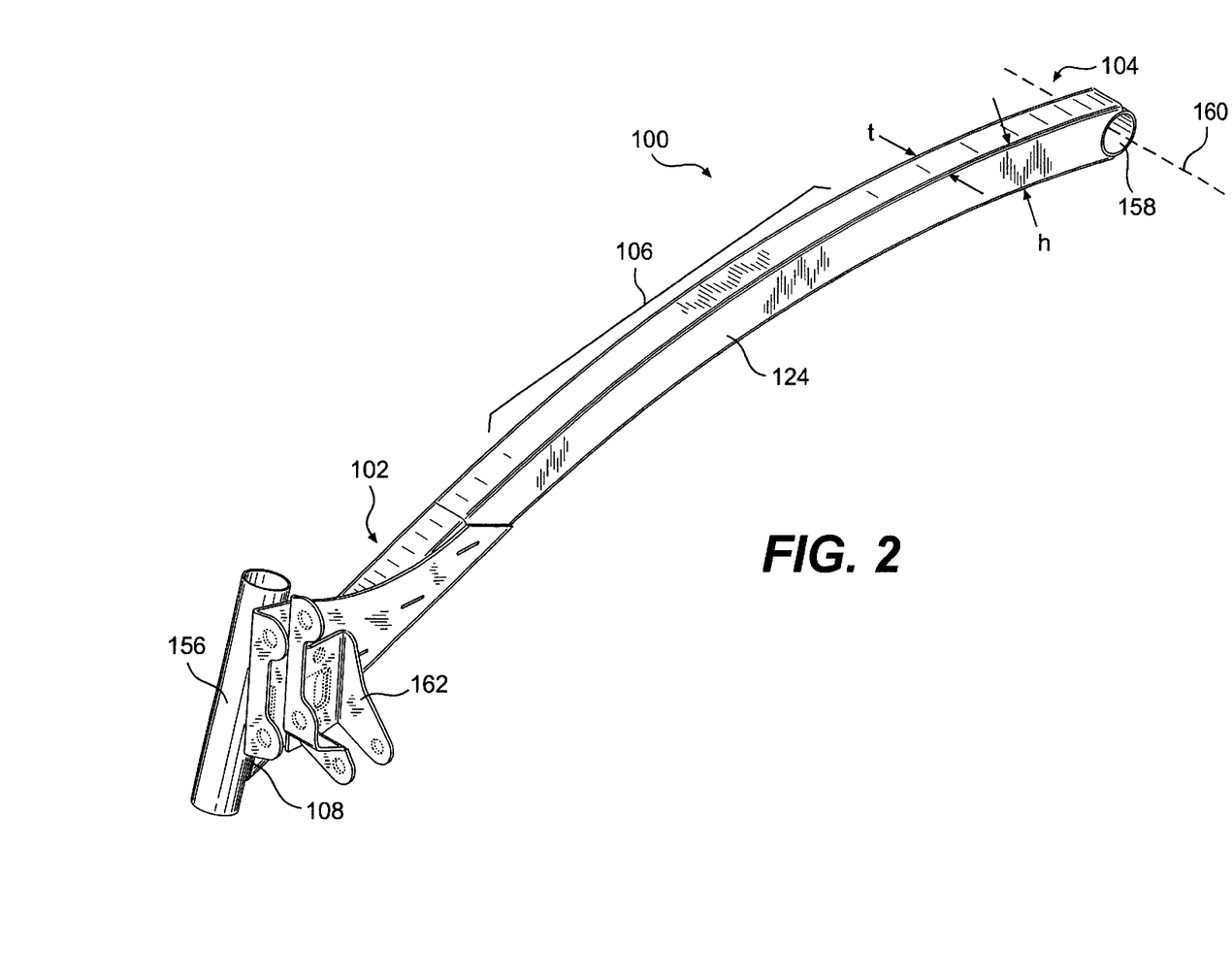
FIG. 2 is a perspective view of a swing arm assembly of the snowmobile of FIG. 1.
Figure 3:
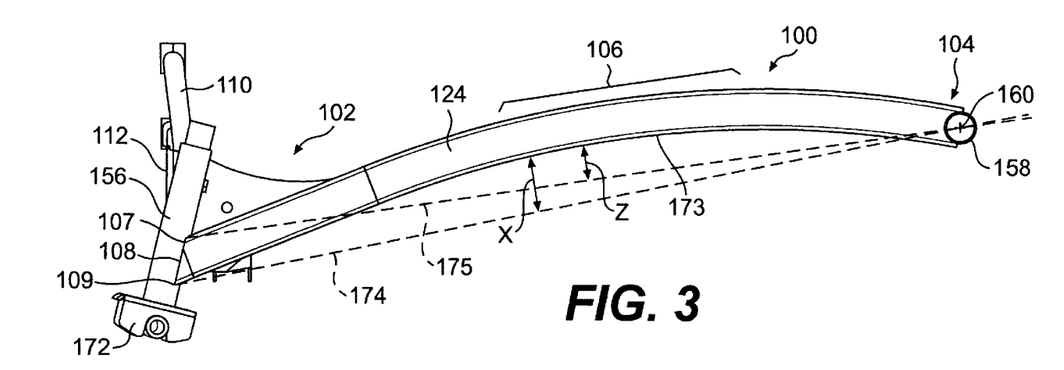
FIG. 3 is a side view of the swing arm assembly of FIG. 2 in conjunction with other elements of a front suspension system.

As shown in FIGS. 2 and 3, the swing arm 124 includes a front portion 102, a rear portion 104, and an intermediate portion 106. The spindle holder 156 attaches to the front portion 102 of the swing arm 124 at a first attachment point 108. The attachment point 108 is defined as a center of the attachment between the swing arm 124 and the spindle holder 156. A bottom 109 of the attachment between the spindle holder 156 and the swing arm 100 is disposed at the lowermost point of contact between the spindle holder 156 and the swing arm 124. The bottom 109 is also preferably disposed at the lowermost point of the front portion 102 of the swing arm 124. A top 107 of the attachment between the swing arm 124 and the spindle holder 156 is disposed at the uppermost point of contact between the spindle holder and the swing arm 124. The top 107 of the attachment is also disposed at the upper front tip of the front portion 102 of the swing arm 124. If the attachment between the spindle holder 156 and the swing arm 124 comprises integral formation, the first attachment point 108, bottom 109, and top 107 are defined where they would have been had the spindle holder 156 and the swing arm 124 been attached to each other after formation. A bracket 162 attaches to the spindle holder 156 and the front portion 102 of the swing arm 124 to provide additional support to the attachment point 108 and attachment points for two radius rods 110, 112 (shown in FIGS. 3 and 4).

As shown in FIGS. 1 and 2, the pivot collar 158 attaches to the rear portion 104 of the swing arm 124 to enable the swing arm assembly 100 to pivot relative to the snowmobile 120 about a swing arm pivot axis 160. This enables the ski 118 to move relative to the snowmobile 120 as described above with respect to the conventional straight swing arm 24.

As shown in FIG. 2, the swing arm 124 has a thickness t and height h which is shown to be uniform throughout the swing arm 124. As would be recognized by one skilled in the art, swing arm 124 need not be of uniform thickness or height and may instead be tapered or vary in an irregular manner. The swing arm 124 may comprise bent sheet metal, carbon fiber, or any other suitable material. The swing arm 124 is preferably tubular to increase its strength but may alternatively have a variety of other cross-sectional shapes (e.g., solid, hollow, U-shape, C-shape, oval, square, rectangle, irregular, taper (longitudinally, laterally, or vertically), etc.).

As shown in FIGS. 2 and 3, the spindle holder 156 is preferably a hollow cylinder that is adapted to accept a spindle 172. The spindle 172 rotates within the spindle holder 156 to enable a driver of the snowmobile 120 to turn the steering ski 118 mounted to the spindle 172 (shown in FIG. 1).

As best illustrated in FIG. 3, a lower edge 173 of the swing arm 124 is curved or bowed upwardly to increase the ground clearance of the intermediate portion 106 of the swing arm 124. The curvature of the lower edge 173 in the illustrated embodiment is neither continuous nor even. A front portion of the lower edge 173 is straight. A rearward curved portion of the lower edge has a radius of curvature that varies as the lower edge 173 progresses rearwardly. It is nonetheless contemplated that the curvature could be continuous and/or have a constant radius of curvature without departing from the scope of the present invention.

The curved swing arm 124 has a greater ground clearance than conventional straight swing arms and therefore provides an increased area for snow or other elements to pass between the ski spindle 172 and the track 130 without contacting the swing arm 124.

The degree of elevation of the intermediate portion 106 of the swing arm 124, which is proportional to the increase in ground clearance, can be measured with respect to a line 174 that extends between the bottommost point 109 (or the bottommost point on the front portion 102 of the swing arm 124) and the spindle holder 156 and the swing arm pivot axis 160. A point on the lower edge 173 is spaced from the line 174 by a distance x, which is preferably between 0 and 20 cm, is more preferably between 2 and 15 cm, is even more preferably greater than 4 cm, and is even more preferably greater than 6 cm.

The degree of elevation of the intermediate portion 106 of the swing arm 124 can alternatively be measured with respect to a line 175 that extends between the top 107 of the attachment (or the upper front tip of the front portion 102 of the swing arm) and the swing arm pivot axis 160. A point on the lower edge 173 is spaced from the line 175 by a distance z, which is preferably between 0 and 20 cm, is more preferably between 2 and 12 cm, and is even more preferably greater than 4 cm.

Figure 4:
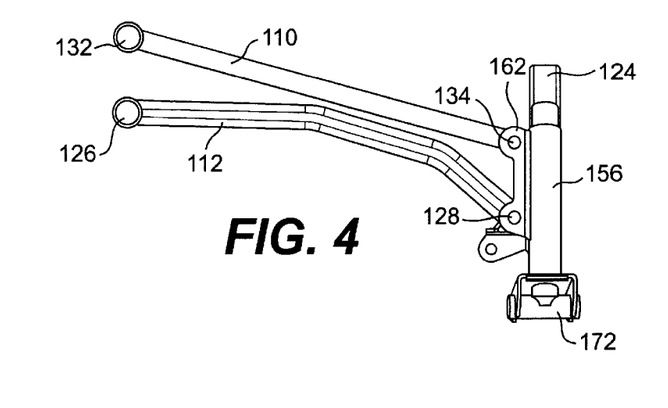
FIG. 4 is a front view of the front suspension system of FIG. 3.

FIGS. 3 and 4 show the swing arm assembly 100 connected to upper and lower radius rods 110 and 112 as well as the spindle 172. While the combination swing arm assembly, radius rods, and spindle shown in FIGS. 3 and 4 are viewed from the left-hand side of the snowmobile, identical numbers have been used to that of the swing arm shown in FIG. 2 because both swing arms are mirror images of each other.

FIG. 4 shows a front view of the swing arm assembly 100, spindle 172 and radius rods 110, 112 combination. Like the swing arm 124, the radius rod 112 preferably curves upwardly to increase the ground clearance of the radius rod 112. The radius rod 112 has a first end 126 adapted to be pivotally connected to the snowmobile 120 and a second end 128 adapted to be pivotally connected to the bracket 162. The radius rod 110 also has a first end 132 adapted to be pivotally connected to the snowmobile 120 and a second end 134 adapted to be pivotally connected to the bracket 162. Radius rods 110 and 120 help maintain the ski spindle 172 and the swing arm 124 in the correct orientation as described above.

Figure 5:
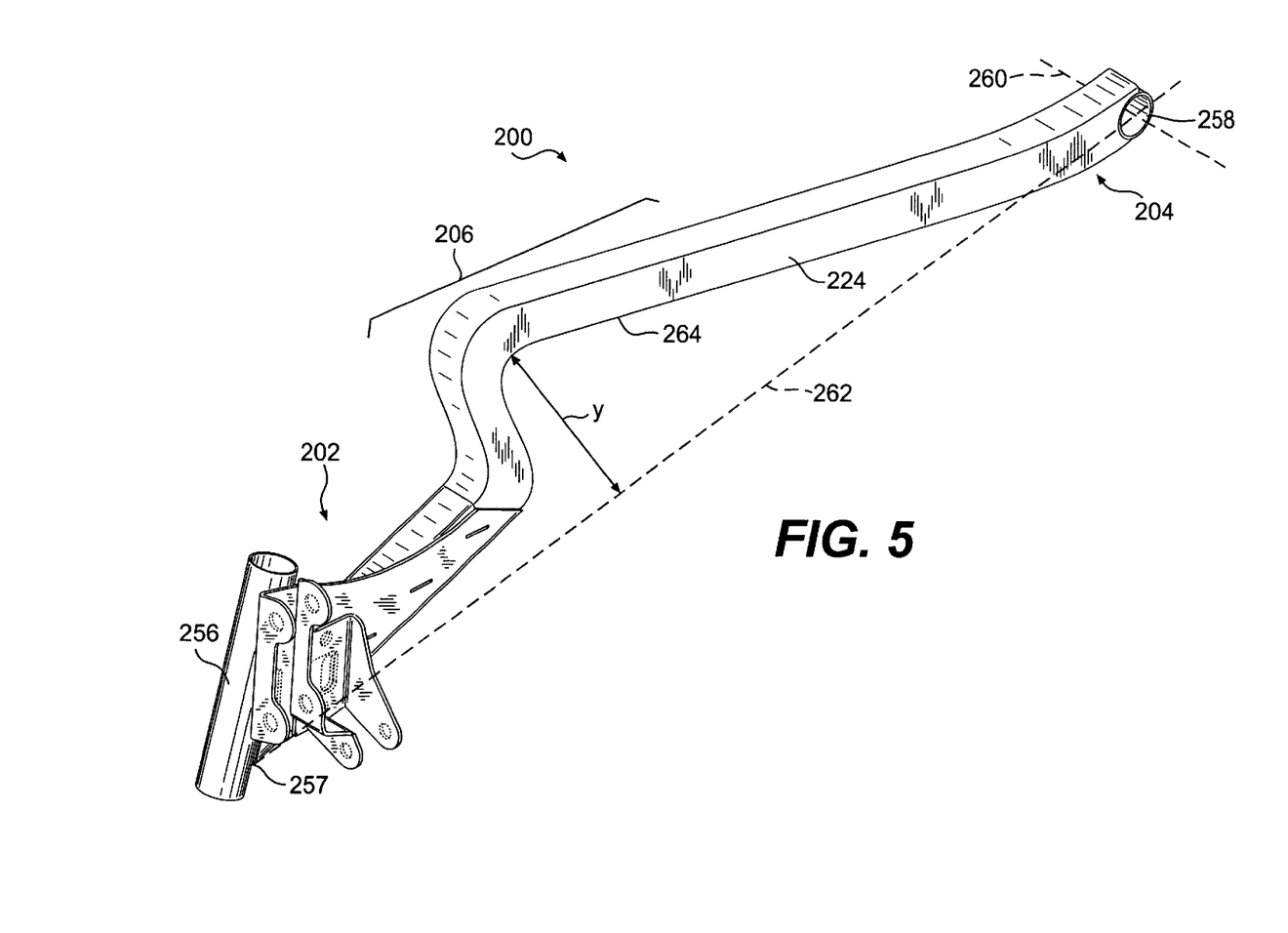
FIG. 5 is a perspective view of a swing arm assembly according to an alternative embodiment of the present invention.

FIG. 5 shows a second embodiment of a swing arm assembly 200, which may replace the swing arm assembly 100 on the snowmobile 120. The swing arm assembly 200 includes a swing arm 224, a spindle holder 256, and a pivot collar 258.

The swing arm 224 has a front portion 202, a rear portion 204, and an intermediate portion 206. The intermediate portion 206 includes a step that increases the ground clearance of the swing arm 224. It is contemplated that the step might include one or more angles and/or curves so that the swing arm 224 includes multiple steps. Alternatively, the step may be formed by a single angle formed between the front and rear portions 202, 204 of the swing arm 224.

The spindle holder 256 attaches to the front portion 202 of the swing arm 224. A bottom 257 of the attachment is defined at the bottommost point of this attachment. The rear portion 204 of the swing arm 224 attaches to the swing arm pivot collar 258, which pivotally connects to the snowmobile 120 for relative pivotal movement about a swing arm pivot axis 260. A line 262 extends between the bottom 257 and the swing arm pivot axis 260. As with the swing arm 124, the step is constructed such that a portion of a lower edge 264 of the swing arm 224 is spaced from the line 262 by a distance y, which is preferably between 0 and 20 cm, is more preferably greater than 2 cm, is even more preferably greater than 4 cm, and is even more preferably greater than 6 cm.

While the invention has been described with reference to several preferred embodiments, it will be understood by those skilled in the art that various changes may be made and equivalents may be substituted for elements thereof without departing from the spirit and scope of the present invention. In addition, many modifications may be made to adapt a particular situation, component, or material to the teachings of the present invention without departing from its teachings as claimed.

What is claimed is:

1. A swing arm assembly, comprising a swing arm that comprises:
   a rear portion adapted to pivotally connect to a snowmobile about a swing arm pivot axis;
   a forward portion having a bottommost point; and
   an intermediate portion extending between the front and rear portions and defining a lower edge,
   wherein a portion of the lower edge is disposed above a line extending between the bottommost point and the swing arm pivot axis.

2. The swing arm assembly of claim 1, wherein the portion of the lower edge is spaced from the line by at least 2 cm.

3. The swing arm assembly of claim 2, wherein the portion of the lower edge is spaced from the line by at least 4 cm.

4. The swing arm assembly of claim 3, wherein the portion of the lower edge is spaced from the line by at least 6 cm.

5. The swing arm assembly of claim 1, wherein a portion of the lower edge is curved.

6. The swing arm assembly of claim 1, wherein a portion of the lower edge is angled.

7. The swing arm assembly of claim 1, wherein a portion of the lower edge forms a step.

8. The swing arm assembly of claim 1, further comprising a pivot collar attached to the rear portion, the pivot collar defining the swing arm pivot axis.

9. The swing arm assembly of claim 1, further comprising a spindle holder attached to the forward portion, the spindle holder being constructed and arranged to pivotally receive a ski spindle.

10. The swing arm assembly of claim 9, further comprising a bracket attached to the spindle holder and adapted to receive at least one radius rod to attach the swing arm to a snowmobile.

11. A snowmobile in combination with the swing arm assembly of claim 1, the snowmobile comprising:
    a frame pivotally connected to the rear portion of the swing arm;
    a straddle-type seat supported by the frame;
    a steering ski supported by the front portion of the swing arm; and
    an endless track supported by the frame.

12. A swing arm assembly, comprising a swing arm that comprises:
    a rear portion adapted to pivotally connect to a snowmobile about a swing arm pivot axis;
    a forward portion having an upper front tip; and
    an intermediate portion extending between the front and rear portions and defining a lower edge,
    wherein a portion of the lower edge is disposed above a line extending between the upper front tip and the swing arm pivot axis.

13. The swing arm assembly of claim 12, wherein the portion of the lower edge is spaced from the line by at least 2 cm.

14. The swing arm assembly of claim 13, wherein the portion of the lower edge is spaced from the line by at least 4 cm.

15. The swing arm assembly of claim 12, wherein a portion of the lower edge is curved.

16. The swing arm assembly of claim 12, wherein a portion of the lower edge is angled.

17. The swing arm assembly of claim 12, wherein a portion of the lower edge forms a step.

18. The swing arm assembly of claim 12, further comprising a pivot collar attached to the rear portion, the pivot collar defining the swing arm pivot axis.

19. The swing arm assembly of claim 12, further comprising a spindle holder attached to the forward portion, the spindle holder being constructed and arranged to pivotally receive a ski spindle.

20. A snowmobile in combination with the swing arm assembly of claim 12, the snowmobile comprising:

a frame pivotally connected to the rear portion of the swing arm;

a straddle-type seat supported by the frame;

a steering ski supported by the front portion of the swing arm; and an endless track supported by the frame.

* * * * *